(12) United States Patent
Stahl

(10) Patent No.: US 8,342,168 B2
(45) Date of Patent: Jan. 1, 2013

(54) SYSTEM FOR HEATING LIQUID BY SOLAR RADIATION

(76) Inventor: Per Ingemar Stahl, Gjerdrum (NO)

( * ) Notice: Subject to any disclaimer, the term of this patent is extended or adjusted under 35 U.S.C. 154(b) by 1312 days.

(21) Appl. No.: 12/057,534

(22) Filed: Mar. 28, 2008

(65) Prior Publication Data

US 2008/0230048 A1     Sep. 25, 2008

Related U.S. Application Data

(63) Continuation-in-part of application No. 10/968,137, filed on Oct. 20, 2004, now abandoned.

(30) Foreign Application Priority Data

Oct. 22, 2003 (NO) .................................. 20034725

(51) Int. Cl.
| F24J 2/00 | (2006.01) |
| F24J 2/16 | (2006.01) |
| F24J 2/40 | (2006.01) |
| F24J 2/44 | (2006.01) |

(52) U.S. Cl. ........ 126/640; 126/639; 126/657; 126/684; 126/696; 137/433; 137/533.17; 137/533.21; 137/533.27; 137/534

(58) Field of Classification Search .................. 126/585, 126/592, 639, 640, 657, 684, 696; 137/433, 137/533, 533.17, 533.21, 533.27, 534

See application file for complete search history.

(56) References Cited

U.S. PATENT DOCUMENTS

| 209,975   | A | * | 11/1878 | Morey ......................... 137/216.2 |
| 388,871   | A | * | 9/1888  | Hoffman .................. 137/533.27 |
| 1,019,603 | A | * | 3/1912  | Cornett et al. ................ 137/433 |
| 1,032,704 | A | * | 7/1912  | Risberg ......................... 137/432 |
| 1,423,679 | A | * | 7/1922  | Pavitchich .................... 137/433 |
| 1,628,069 | A | * | 5/1927  | Schmidt et al. ............ 137/454.6 |
| 1,795,749 | A |   | 3/1931  | Winters |
| 1,844,613 | A | * | 2/1932  | Thompson .................... 137/496 |
| 1,853,480 | A |   | 4/1932  | Wheeler et al. |
| 1,897,492 | A | * | 2/1933  | Ledoux ......................... 137/433 |
| 1,978,730 | A |   | 10/1934 | Weber |
| 2,064,345 | A |   | 12/1936 | Hodgson |
| 2,105,893 | A | * | 1/1938  | Salmonsen ................ 122/14.31 |
| 2,122,821 | A |   | 7/1938  | Mohr |
| 2,167,576 | A |   | 7/1939  | Kiser |
| 2,194,805 | A | * | 3/1940  | Moore ........................ 237/8 R |
| 2,787,376 | A | * | 4/1957  | Coulson ....................... 210/119 |
| 3,909,219 | A | * | 9/1975  | Fromknecht ................... 96/406 |

(Continued)

FOREIGN PATENT DOCUMENTS

AU           574384          7/1988

(Continued)

*Primary Examiner* — Carl Price
(74) *Attorney, Agent, or Firm* — Young & Thompson

(57) ABSTRACT

A system for heating liquid using solar radiation, includes a plurality of solar panels (1, 2, 3, 4, 5), at least one reservoir for heated liquid and pipes for circulating liquid between the respective solar panel and the at least one liquid reservoir, the liquid circulating by gravity circulation. The present system is characterized in that a non-return valve (17) for controlling the flow of heated liquid from the respective solar panel is placed in a portion of the circulation pipe between the upper end of the solar panel and the at least one liquid reservoir, the non-return valve (17) being adapted to open and close at a predetermined pressure in the liquid flow from the solar panel.

17 Claims, 7 Drawing Sheets

U.S. PATENT DOCUMENTS

| | | | | |
|---|---|---|---|---|
| 4,059,127 A | * | 11/1977 | Olson | 137/244 |
| 4,080,956 A | | 3/1978 | Dawley | |
| 4,086,911 A | | 5/1978 | Futch | |
| 4,088,149 A | * | 5/1978 | Logsdon | 137/433 |
| 4,088,266 A | | 5/1978 | Keyes | |
| 4,110,986 A | * | 9/1978 | Tacchi | 60/641.8 |
| 4,184,481 A | | 1/1980 | Tornquist | |
| 4,213,448 A | | 7/1980 | Hebert | |
| 4,286,573 A | * | 9/1981 | Nickel | 122/14.31 |
| 4,294,229 A | * | 10/1981 | Maloney | 126/639 |
| 4,296,739 A | | 10/1981 | Bolding | |
| 4,314,667 A | * | 2/1982 | Sigworth, Jr. | 236/93 R |
| 4,346,731 A | | 8/1982 | Sigworth, Jr. | |
| 4,398,053 A | | 8/1983 | Orillion | |
| 4,399,807 A | * | 8/1983 | Buckley et al. | 126/599 |
| 4,409,959 A | | 10/1983 | Sigworth, Jr. | |
| 4,419,983 A | * | 12/1983 | Holland | 126/639 |
| 4,452,231 A | * | 6/1984 | El-Shayeb | 126/584 |
| 4,474,209 A | | 10/1984 | Akhtarekhavari | |
| 4,556,084 A | * | 12/1985 | Frawley | 137/526 |
| 4,676,225 A | | 6/1987 | Bartera | |
| 4,685,445 A | * | 8/1987 | Seidel | 126/639 |
| 4,764,167 A | * | 8/1988 | Tu | 604/173 |
| 4,782,816 A | | 11/1988 | Salgado et al. | |
| 4,869,234 A | | 9/1989 | Rapozo | |
| 4,964,395 A | | 10/1990 | Salgado et al. | |
| 5,375,621 A | | 12/1994 | Gaehwiler | |
| 5,409,033 A | * | 4/1995 | Hirayama | 137/202 |
| 6,014,968 A | | 1/2000 | Teoh | |
| 6,119,682 A | * | 9/2000 | Hazan | 126/638 |

FOREIGN PATENT DOCUMENTS

| | | | |
|---|---|---|---|
| DE | 33 23 360 A | | 1/1985 |
| EP | 0114005 | | 7/1984 |
| GB | 2345002 | * | 6/2000 |
| JP | 57-74550 | | 5/1982 |
| JP | 58-130958 | | 8/1983 |
| JP | 59009455 A | * | 1/1984 |
| JP | 60-50342 | | 3/1985 |
| SE | 51060 | | 1/1920 |
| WO | 90/04746 | | 4/1990 |

* cited by examiner

SYSTEM FOR HEATING LIQUID BY SOLAR RADIATION

The present invention relates to a system for heating liquid by solar radiation, comprising a plurality of solar panels, at least one reservoir for the heated liquid from the solar panels and pipes for circulating liquid between the respective solar panel and the at least one liquid reservoir. More specifically, the invention relates to such a system wherein the liquid circulates by gravity circulation.

There are already many systems involving the use of one or more solar panels to harness solar radiation for heating a liquid, such as water for domestic use. Two different systems of this type are taught in EP Patent No. 0114005 and U.S. Pat. No. 4,685,445.

According to EP Patent No. 0114005, the reservoir for heated liquid is mounted at a level higher than that of the solar panel and a pump provides circulation of the liquid between the reservoir and the panel. Furthermore, a separate device in the form of a tubular body, located in the flow circuit between the solar collector and the liquid reservoir, is used for correct orientation of the flow of liquid.

The system according to U.S. Pat. No. 4,685,445 differs from the aforementioned solution in that it uses gravity circulation for circulating heated liquid. This means, among other things, that the pump is omitted and the liquid reservoir is mounted level with the solar panel. However, the prerequisite for correct liquid flow is that the flow circuit pipes connecting the solar panel and the liquid reservoir are arranged in a very specific manner.

Furthermore, U.S. Pat. No. 4,782,816 and SE Patent No. 510601 disclose solutions where several solar panels are assembled to form a closed space, e.g., for accommodating circulation pipes and other necessary equipment.

It is also known from AU 574384 (Boadle) a solar panel system based on the thermosiphonic principle. Boadle also mentions the possibility to place the valve in conjunction with the upper end of the solar panel. However, Boadle uses a check valve comprising a ball that is freely moveable within the valve housing. In a thermosiphonic system the liquid flow is highly irregular and contains air bubbles. When a ball valve is used the result is that the ball is tossed around in the valve housing, hitting the walls of the housing and sometimes landing on the seat, closing off the liquid flow for a short period of time. Consequently, the ball will increase the irregularity of the flow out of the solar panel, which results in decreased efficiency and greater wear on the components of the system. The irregular flow also makes it difficult to separate air from the liquid. The high content of air will further decrease the efficiency and wear on the components. Even if an air trap is included, the air will be mixed with the water to an extent that will reduce the function of the air trap.

Moreover, the ball is subject to a very high degree of wear and the life expectancy of the ball is very low. Over time the ball will be reduced in size and at some point it may escape the valve housing, either by shear reduction in size or because it has become disintegrated. The ball or ball part will be brought into other parts of the system, where the debris may cause damage or get stuck. Consequently, the ball has to be replaced at certain intervals. This means stopping the system for a period of time, and possibly also emptying the system of liquid and bleeding the system to get the air out again before start-up.

Another disadvantage of the ball check valve is that the ball has a very small area against the flow. This means that there has to be a relatively large pressure difference between the solar panel and the reservoir before the valve opens. This means that the valve will function poorly if the temperature difference (and hence pressure difference) is low.

As stated in Boadle, this system will work best for relatively low temperatures.

U.S. Pat. No. 4,080,956 (Dawley) describes a system that cannot function according to the thermosiphonic principles. The direction of flow of the liquid is from the liquid reservoir into the top of the solar panel and returning to the reservoir from the bottom of the solar panel. This means that the flow is in the opposite direction relative to the natural direction of circulation in a thermosiphonic system. The system of Dawley will not work in practice. In order to work, the direction of flow must be reversed. Dawley mentions a check valve but does not show how this check valve may be designed.

JP 60-50342 seems to work according to the thermosiphonic principles. However, no check valve is show. Consequently, there is a risk of reversing the energy flow after sunset when the liquid in the solar panels becomes cooler than the liquid in the reservoir. If this happens, a major part of the energy gained during the day will get lost and there will be no hot water at the start of the day.

U.S. Pat. No. 1,978,730 (Weber) shows a combined adjustable valve and check valve having a dome shaped valve body. The axis of movement of this valve is slightly inclined so that the gravity will assist in the opening of the valve. This also means that even though a slight negative pressure difference (against the intended flow) should occur across the valve, the valve will not close until the negative pressure increases above a certain amount. In a thermosiphonic system such a slight negative pressure may frequently occur, and using the valve of Weber would therefore lead to a substantial loss of heat.

For this valve to be used in a thermosiphonic system, the valve orientation first would have to be changed from an orientation where the axis of movement is practically horizontal to a vertical orientation of the axis. Even though the valve was re-orientated, it would work only poorly. The valve is dome shaped and has a very small area towards the flow. It would take a certain pressure difference to lift the valve. The valve body is also quite massive, including a massive stem, which indicates a heavy valve body. This means that a further increase in pressure difference is necessary to lift the valve body. The heavy weight is of little consequence when the valve axis is oriented horizontally, but if oriented vertically it will result in poor function when the temperature difference is low, which is frequently the case in a thermosiphonic system. In Weber a pump is used, so low pressure differences is not an issue.

U.S. Pat. No. 1,844,613 (Thompson) shows a check valve with a dome shaped valve body. The valve is used in a system that is pressurized. This is evident from the supply pipe shown, which probably connects to a main water supply. The system has to be constantly re-supplied by water from the main line, since there are spigots placed around the circuit, from which water is tapped. The purpose of the valve is to prevent cold water from the bottom of the boiler from entering the circuit. When none of the spigots are open, the valve will allow a continuous flow of water in the circuit. This flow of water leads to a loss of heat, and such a system would therefore be out of the question in a hot water supply system of today.

The key element of the present invention is a particular design of the check valve, which is different from all valves that have been used previously in connection with solar collectors.

When the thermosiphonic principle is used, the temperature and pressure differences are very small. The force that acts to open the valve is mainly generated by the tendency of the circulation liquid (water) to flow from the hotter part (the solar panel) to the colder part (the reservoir). This is especially true if the volume of the circulating fluid is very small. An example of water volume in the system of the present invention is in the order of one to three liters in the solar collector.

This means that the force that acts to open the valve is very small. An estimate is that the pressure acting on the valve at a temperature of about 20° C. is as low as 0.03 N/dm$^2$. With a valve area of 20 cm$^2$ the resulting force is about 0.0006 N (which is equivalent to 0.000134 lbf or 0.002 oz). This is about the same weight as a 1 in$^2$ piece of ordinary writing paper.

As the temperature increases the force acting on the valve will also increase. At a temperature of about 80° C. the force will have increased to about 0.2 N (34 times the force at 20° C.). This is just sufficient to balance a valve weighing 20 grams and having an area of 20 cm$^2$. At 100° C. the force is about 36 times the force at 20° C., which is slightly above the force needed to open the valve.

According to the present invention the valve body is virtually flat, horizontal, light in weight and has an area which is substantially greater than the cross section of the circulation pipes. These factors are important to achieve a reliable opening of the valve.

Since the valve body is flat, bubbles from the air and steam in the circulation liquid will have a tendency to collect on the underside of the valve body. These bubbles will exert an upward lifting force on the valve and assist in the opening of the valve, so that the valve will open at an earlier stage than if the whole force was exerted by the water pressure alone. The contribution from the air bubbles is of significant importance to the functioning of the system.

The bubbles which are formed in the lower part of the panel will expand as they rise up towards the upper part of the panel due to the decrease of hydrostatic pressure. This means that the bubbles will be relatively large when they encounter the valve. Consequently, they will also impose relatively large buoyancy on the valve.

It is also much easier to adjust the timing of the opening of the valve than with any of the known valves by adjusting the weight and area of the valve. In the system of the present invention the valve can be designed to opening at temperature differences between the reservoir and the solar panel as low as 4-5° C.

The importance of having a valve that will open at a very low pressure difference can also be illustrated by the fact that the expansion of the liquid will go towards the least resistance. The solar panel is in communication with the reservoir also through a line between the reservoir and the lower part of the solar panel. The hydrostatic pressure in the lower part of the solar panel is much higher than in the upper part. If the valve resists opening, the expansion of the liquid may then force liquid through this lower line and into the reservoir. The more liquid is forced this way, the lower force will be exerted on the valve. The consequence will be that the substantial amount of liquid in the solar panel will not leave the solar panel, and the liquid in will be heated by the sun until (if enough sunshine) the liquid starts to boil. When this happens the valve will probably open to let steam pass through. However, the hot liquid in the solar panel will be forced downward by the head of steam collected in the upper part of the solar panel and expand into the reservoir through the lower line. The result is a very inefficient system without any actual circulation.

The system of the present invention is based on exploiting the forces that are created by temperature differences and using a valve which has a higher specific weight than the liquid. By doing this is achieved a valve that will open as soon as the combined pressure difference and buoyancy of the bubbles is large enough to overcome the weight of the valve. The valve will open to substantially full extent and the water will rush through the valve. In Boadle the valve ball will jump around and disturb the flow.

If the fact that Weber's system is not a thermosiphonic system is ignored, the system would still not work with the valve described in Weber. It is assumed that the valve of Weber is about the same size as the valve in a household valve tap. In this case the valve will weight about 20 grams and the diameter will be about 10 mm, i.e. a cross section of about 1 cm$^2$. Based on the relationship between estimated weight and estimated area, calculations show that in order to lift this valve the pressure difference must be close to 700 times bigger than the pressure difference at 20° C. Such a pressure difference could in theory be achieved in a pressurized system. However, no solar panels know known today could withstand such a pressure. In any case such a pressure would not be reached until the water reaches the boiling point. As explained above, the result would be that a substantial amount of the water will be force backwards into the reservoir.

The valve of Thompson will function much in the same way as the valve of Weber. Since the valve is curved, a substantial portion of the lift is lost and the result is that a much greater force is needed to lift the valve than what is available in an open system based on temperature differences, i.e., based on natural convection, or in other words a thermosiphonic system. It is obvious that Thompson is a pressurized system. If it had not been this, the water would run much too slowly from the taps to be of any practical use.

The valve of Thompson is dome shaped and that the valve body seems to be hollow. These two differences have quite opposite effects. A hollow valve body would result in the valve body being buoyant and that it will float in the water. If the valve body is filled with air, the buoyancy effect would be the dominant, and result in the valve being open even if the pressure difference is slightly negative (i.e. against the desired direction of flow). If it is not filled with air, the effect of the small area will result in a requirement of a large pressure difference for the valve to open. If the pressure difference is too low to open the valve, air bubbles may collect on the underside of the closed valve body. These will eventually lift the valve body, but due to the curved shape of the valve body, the air bubbles will escape as soon as the valve body opens, and the valve will immediately close again before any substantial mount of water has been let through. This will result in an irregular behaviour of the valve and hence the flow of liquid.

In the way Thompson is intended to work, these effects are of little significance, since the system is not depending on flow through the valve when the temperature difference is low. Due to the cooling of the water when it is flowing through the circuit, the temperature difference will always be of a magnitude that will ensure opening of the valve. Moreover, if water is tapped from one of the spigots, water will flow from the heater to the spigot even if the valve is closed.

Contrary to the previously known check valves, the present invention uses a disc shaped valve that does not possess the above deficiencies. Due to the valve being flat and thin, meaning that it has a relatively large area compared to the weight, it will lift from its seat with only a small pressure difference (i.e. temperature difference) between the solar panel and the liquid reservoir. Bubbles in the flow will tend to collect on the flat horizontal bottom surface of the valve and "hold" the valve in an elevated position. This means that the valve will not close again until the pressure difference has become so low that there is virtually no flow, or the water tends to flow in the opposite direction.

Since the valve motion is controlled by a spindle, the valve body will not jump around in the housing, but gently move between a closed position and an open position. Consequently, the wear on the valve is very little and the life expectancy will be long.

Consequently, the present invention has devised a system containing a valve that will operate efficiently even when the temperature differences are low, which none of the prior art systems can achieve.

The main object of the present invention is to provide a system that will work with the fewest possible moveable components and without any circulation aid than what is supplied from the sun heat. The system should also be self-regulating and self sustained, i.e. require as little maintenance as possible.

Since the pressure in the system varies depending upon the temperature reached at any given time during the solar collection, i.e., the pressure increases when the temperature rises and vice versa, it is the pressure difference in the liquid that the float body in the non-return valve responds to in order to open and close the valve respectively. This pressure difference is further aided by the lifting force provided by air bubbles collecting on the underside of the valve body.

In this way, correct flow of heated liquid from the respective solar panel is ensured by the non-return valve, which comprises a valve seat with a central fluid opening, a movable flat and thin float body for opening and closing the fluid opening and a spindle for controlling the movement of the float body.

In a preferred embodiment, the float body is in the form of a thin disc which has an outer element of greater thickness, and the thickness of the outer element can be varied according to the liquid in the system. Furthermore, the at least one liquid reservoir in the system preferably has a large height relative to its dimensions in cross-section.

The circulation pipes for the liquid in the system may be part of a flow circuit which is open to the respective liquid reservoir, and which consists of flow channels in the respective solar panel and a pipe which respectively conveys the liquid from the upper end of the solar panel to the upper end of the liquid reservoir and back from the lower end of the liquid reservoir to the lower end of the solar panel. This allows heated water and make-up water respectively to be taken from and supplied directly to the at least one liquid reservoir. Alternatively, the circulation pipes for the heated liquid may be part of a flow circuit that is closed to the respective liquid reservoir, and which consists of flow channels in the respective solar panel and pipe sections which respectively convey the liquid from the upper end of the solar panel, through the respective liquid reservoir and back to the lower end of the solar panel. In this alternative, the liquid in the system may advantageously be anti-freeze solution, oil, alcohol etc. instead of water.

In the present system at least two solar panels can be joined to each other along their adjacent lateral edges, whilst their outer, free edges are positioned in such relationship to each other that a space is formed between the solar panels for accommodating the at least one liquid reservoir and the circulation pipes. The upper end of the solar panels that constitute the side walls of the formed space may slant downwards in the direction of the joined lateral edges and be covered by a solar panel placed on top of the joined solar panels. Furthermore, the collection of sunrays can be increased by mounting a solar panel on the upper end edges of the solar panels that form the space for accommodating the reservoir and circulation pipes, and/or two additional solar panels which each extend outwards from and are connected to the free lateral edge of the respective joined solar panels. Making the upper end of the solar panels that constitute the side walls of the formed space slant downwards in the direction of the joined lateral edges will enable more of the sunlight to pass over the central solar panels and fall onto the additional solar panels.

The efficiency of the system can be further increased by placing at least one sunlight reflector directly on and/or at a distance from the solar panel or panels in question.

The use of a non-return valve in at least the upper portion of the circulation circuit close to the respective solar panel thus ensures that only solar panels with the desired liquid temperature deliver to the liquid reservoir and prevents solar panels with too low a temperature from "stealing" energy from the active solar panel in the system. The circulation and compactness of the system is further enhanced by the use of at least one liquid reservoir that has a large height relative to its dimensions in cross-section, and which is located in close proximity to the solar panels, and also by the special arrangement of the solar panels.

In addition, as particular advantages of the present invention, brief mention should be made of the fact that the atmospheric pressure inside the at least one reservoir provides rapid circulation and also stable operation during the storage of the heated liquid. The liquid delivered always has a high temperature, even when the system is not fully charged, and the system is scalable through adaptation to the size and shape of and/or the number of solar panels. Moreover, the system is inexpensive to manufacture as it has few components and the path of the liquid flow circuit is short.

The invention will now be described in more detail with reference to the preferred embodiments shown in the attached drawings, in which.

Figure 1:
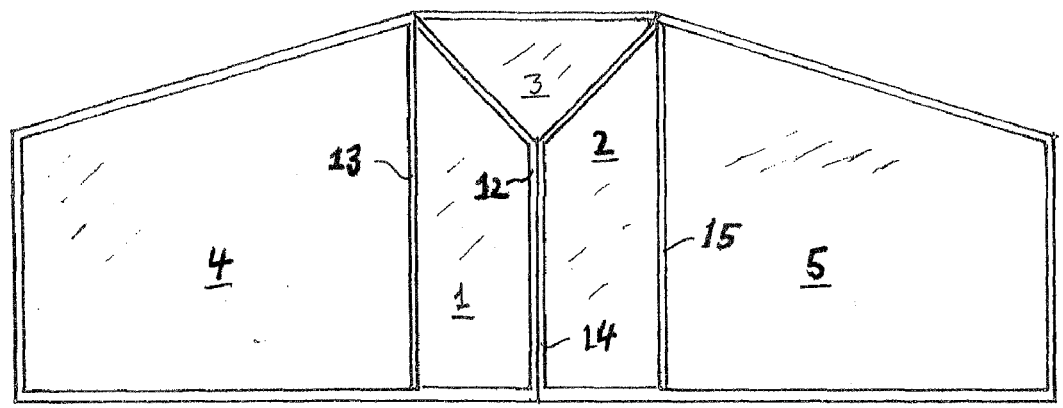
FIG. 1 is a schematic lateral elevational view of a system including a plurality of solar panels according to the invention.
Figure 2:
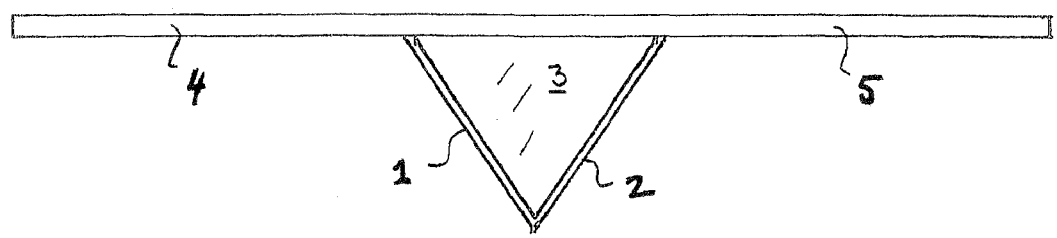
FIG. 2 is a schematic upper end view of the system shown in FIG. 1.

The present system for heating liquid uses conventional solar panels, and the circulation between solar panels and liquid reservoir takes place by means of so-called gravity flow, i.e., without the use of a pump. Although only one reservoir for heated liquid from the solar panels is shown in the drawings, it will be understood that the system can, when required, comprise more than this one reservoir. The system is intended primarily for use in heating water for domestic purposes in, for example, individual dwelling units such as detached houses and holiday cottages, swimming pools etc. Furthermore, the system can be positioned as an independent unit in the surrounding landscape or integrated in a suitable manner into the facade of the house itself. The system could also be connected to a heat exchanger unit converting heat to electricity. In conditions of little sunlight, a constant temperature can be obtained in the system in different ways, for example, by using electricity. The system may also be equipped with a heat pump on the solar panels in order to obtain a higher temperature in the liquid, e.g., water.

Figure 4:
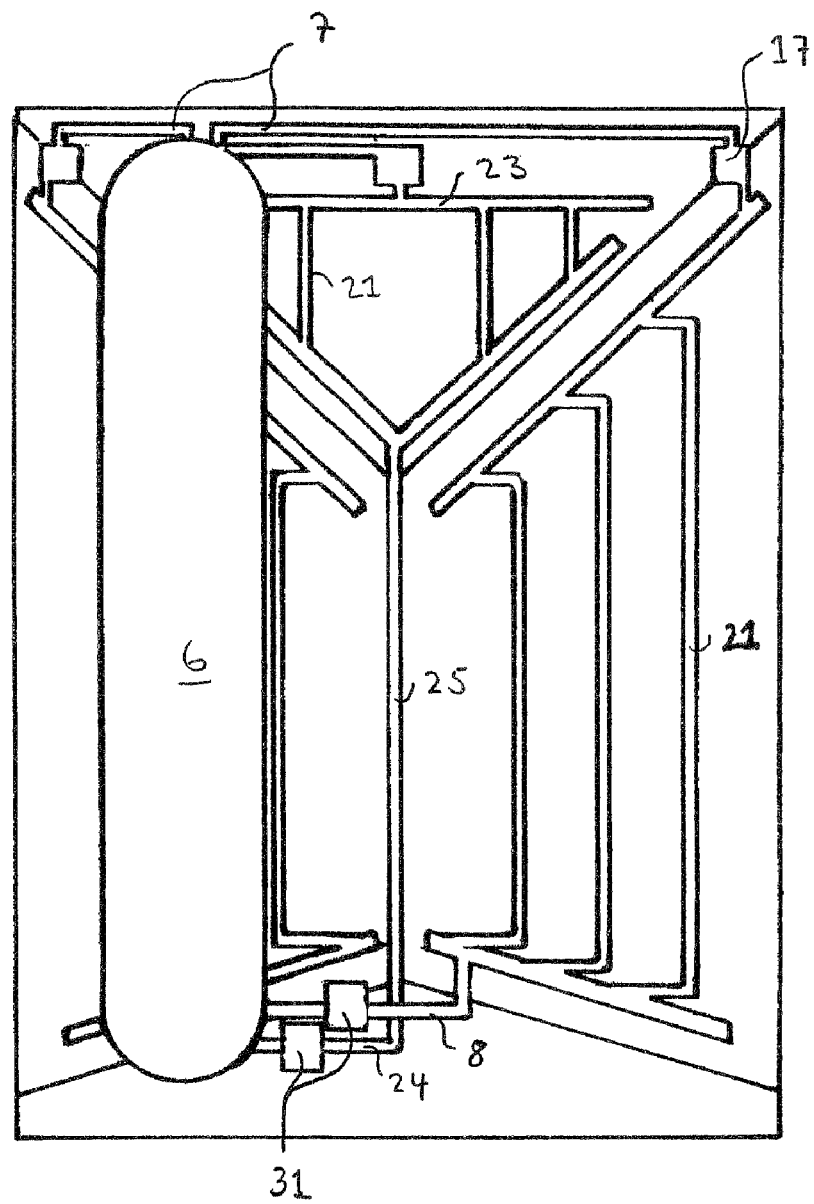
FIG. 4 is a schematic detailed sectional view of an embodiment of a flow circuit for circulating liquid between a reservoir and the solar panels in the system shown in FIG. 1.
Figure 5:
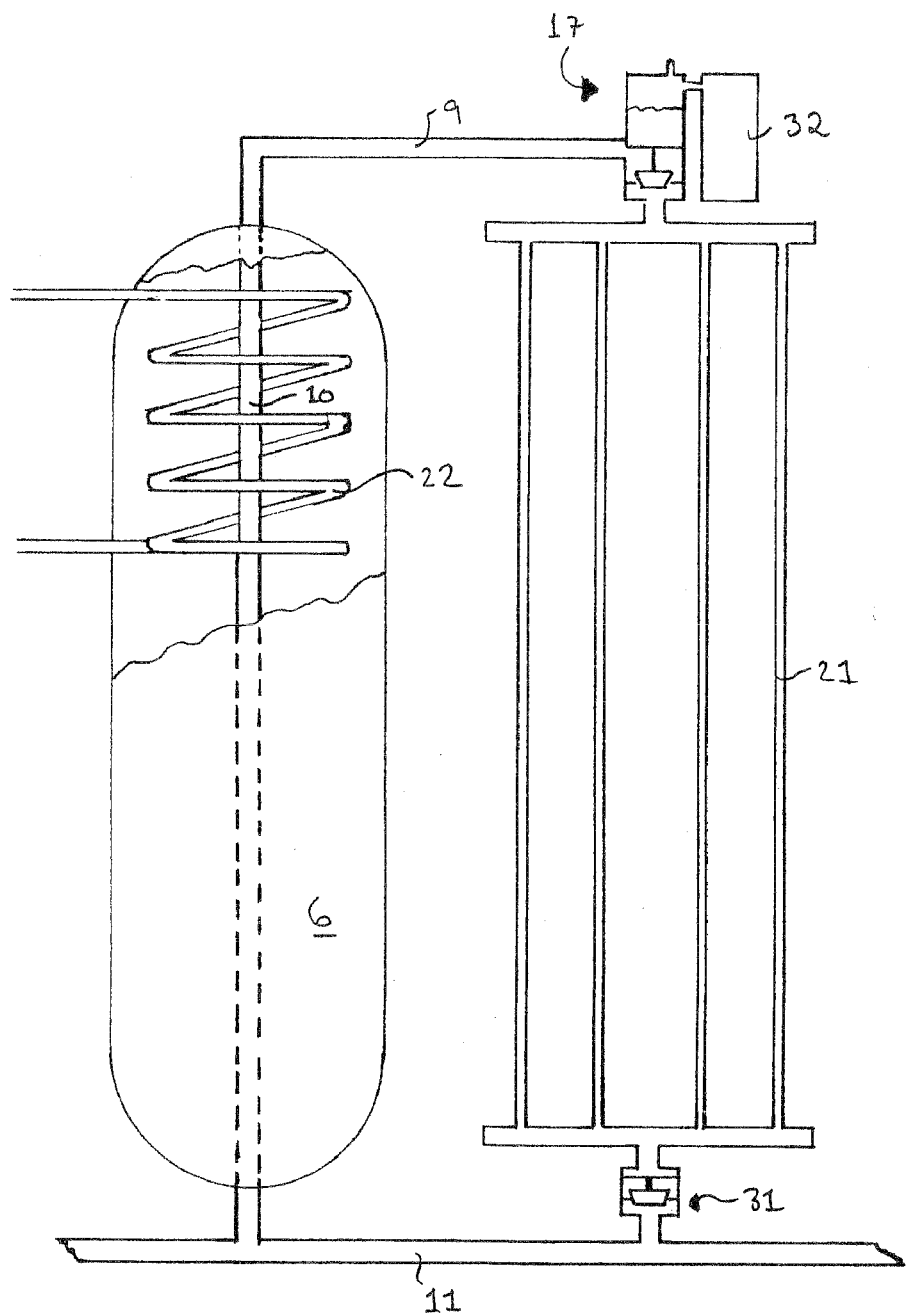
FIG. 5 is a schematic detailed sectional view of a second embodiment of the flow circuit.

As shown in FIG. 1, a preferred embodiment of the system according to the invention comprises two main solar panels 1, 2 and three additional solar panels 3, 4 and 5. The main solar panels consist of two upright solar panels that are joined together along one of their lateral edges 12, 14. At the same time, their opposite lateral edges 13, 15 are positioned in such relationship to each other that a space is formed for accommodating a liquid reservoir and a flow circuit for the liquid in the system, consisting of separate pipes or pipe sections and flow channels in the respective solar panel, as shown in FIGS. 4 and 5. One of the additional solar panels 3 is placed on top of the upper end edges of the main solar panels 1, 2 whilst the two other solar panels 4, 5 extend outwards from and are each connected to a free lateral edge of the main solar panels 1, 2.

The two upright main solar panels 1, 2 are set at an angle of 90° in this case, but this angle may of course be varied. The use of more upright main solar panels is also possible, for example, three which are so positioned that the foremost panel extends parallel to the additional solar panels 4, 5, and the two other panels extend backwards, either at right angles from or oblique to the foremost upright solar panel. Alternatively, the main solar panels may be curved, with two or more placed together to form a space having a semicircular cross-section for accommodating the liquid reservoir and the circulation pipes.

Figure 3:
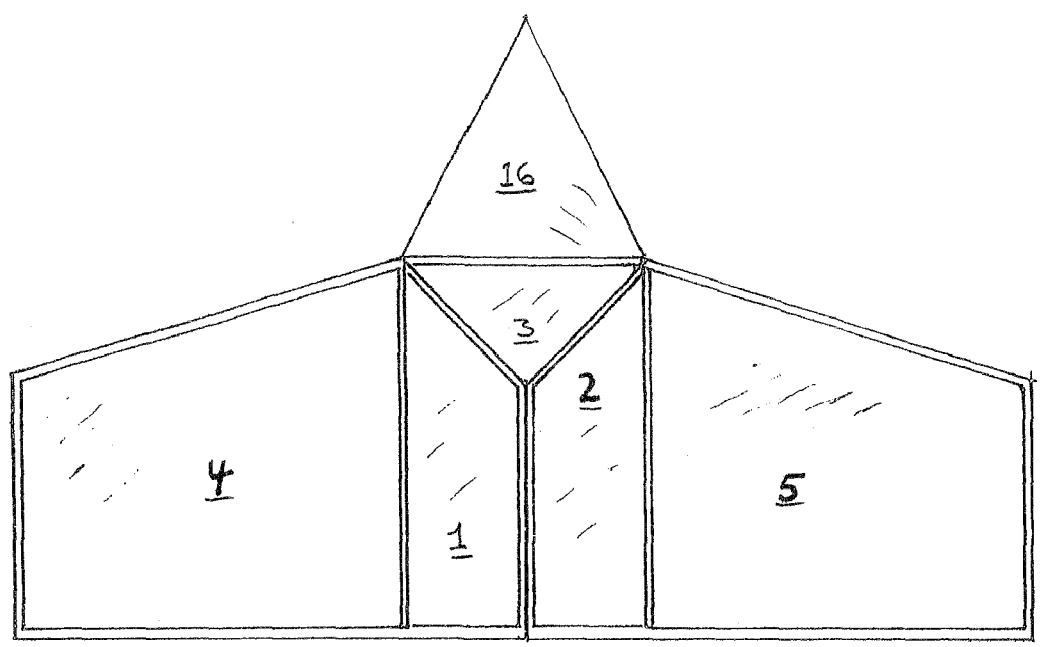
FIG. 3 is a schematic illustration of a second embodiment of the present system supplemented with a sunlight reflector mounted directly on the solar panel.

Making the upper edge of the two upright solar panels 1, 2 slant forwards in the direction of the joined lateral edges 12, 14 will enable more sunlight to fall onto the upright additional solar panels, thus rendering the system more efficient. The output can be further increased by mounting one or more sunlight reflectors in connection with the present system, i.e., by up to 30% per reflector. Each individual reflector 16 may be placed directly on the solar panel in question, as shown in FIG. 3, or at a suitable distance from the panel, for example, it can be placed directly on the ground (not shown). The reflectors may optionally be reversible, so that they can in a suitable manner be adjusted manually or automatically according to the varying height and/or position of the sun. The output of an independent system may be enhanced by mounting upright solar panels on the rear side of the additional solar panels 4, 5 and above the opening in the space for accommodating, inter alia, the liquid reservoir 6.

The reservoir 6 for receiving the liquid that circulates in the present system is of the upright type, having a large height relative to its dimensions in cross-section, and is, as already mentioned, located in the space formed behind the two upright main solar panels 1, 2 which are joined to each other. As shown in FIG. 4, the liquid circulates in a flow circuit that comprises the liquid reservoir 6 itself, and which otherwise consists of flow channels 21 in the respective main upright solar panel 1, 2 and separate pipes 7, 8 which respectively convey the liquid from the upper end of the solar panel to the upper end of the liquid reservoir and back from the lower end of the liquid reservoir to the lower end of the solar panel. The flow circuit for each one of the upright additional solar panels 4, 5 will have a similar structure. Furthermore, the horizontal additional solar panel 3 has a flow circuit consisting of the flow channels 21 therein and separate pipes 23, 24, 25 running to and from the liquid reservoir 6. The different upper pipes 7, 23 and lower pipes 8, 24 may be passed individually into and out of the liquid reservoir 6, or may optionally be connected for common entry and exit.

In the alternative embodiment shown in FIG. 5, the flow circuit is closed to the liquid reservoir 6, and consists of flow channels 21 in the respective upright main solar panel 1, 2 and pipe sections 9, 10, 11 which respectively convey the liquid from the upper end of the solar panel, through the liquid reservoir and back to the lower end of the solar panel. In this embodiment, the flow circuit for the horizontal main solar panel 3 and the two additional solar panels 4, 5 is conveyed in the same closed manner through the liquid reservoir 6. The liquid from the different solar panels can be conveyed though the liquid reservoir 6 by means of one single or several vertical pipe sections 10.

The embodiment of the flow circuit shown in FIG. 4 is particularly favourable for direct drawing of heated water for use from the liquid reservoir 6 and for topping the reservoir up with fresh water. However, this does not prevent the use of a separate heat exchanger that is placed in communication with the liquid in the liquid reservoir, and which transfers heat energy to water outside the reservoir. The flow circuit shown in FIG. 5 is particularly suitable in those cases where heated water is not to be drawn directly from the liquid reservoir 6, but heat energy is transferred onward by a heat exchanger 22 or the like that is arranged in a suitable manner therein. In such cases, a liquid other than water can be used in the system, e.g., anti-freeze solution or oil.

Correct control of the flow of heated liquid in the flow circuit is ensured by a non-return valve 17 that is located in each individual upper pipe 7, 23 or pipe section 9 between the respective solar panel 1, 2, 3, 4, 5 and the liquid reservoir 6, so that the non-return valve 17 forms the highest point in the flow circuit. The non-return valve 17 is also adapted to open and close at a predetermined pressure in the liquid from the solar panel. This means that the flow circuits will be opened and closed in pulses, so that the hottest solar panel can be tapped for heat energy first. Consequently, the non-return valve 17 in the respective flow circuit will open and close alternately, as the pressure rises and falls to the required level. Each individual non-return valve 17 is equipped with a built-in expansion chamber 29 which has a suitable air valve 30 for releasing any air bubbles which otherwise could bring the system to a halt. This expansion chamber 29 may also be a separate part form the valve 17. In an open system the non-return valve 17 may optionally be equipped with a large separate expansion chamber 32, see FIG. 5. According to need, the circulation circuit can in addition be provided with a second non-return valve 31 of a suitable type located in the lower pipes 8, 24, 11, see FIGS. 4 and 5. This valve 31 is usually not needed.

The expansion chambers 29, 32 thus deal with any foam formation from the liquid in the circuit. Before operation is started, the circuit is filled to a level where the liquid is above the upper circulation pipe, and then the system is pressurised with air. Optional compression of this air prevents the circuit from bursting. When the reservoir and the circuit are connected, double pressure valves (not shown) may also be mounted so that the system can be closed at a predetermined pressure level. After such closing, the system must be reactivated and pressurised.

Figure 6:
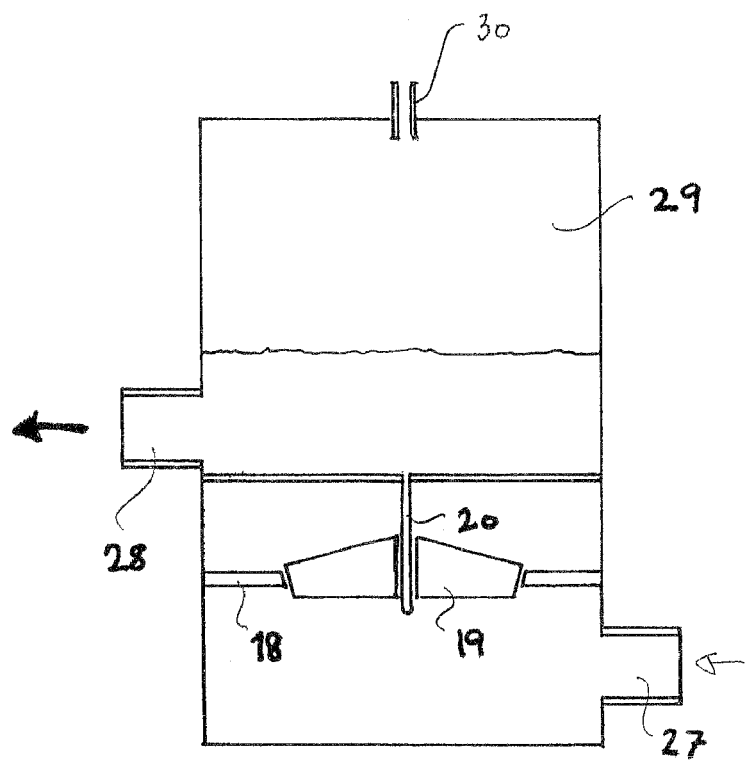
FIG. 6 is a vertical section of a non-return valve adapted for controlling the liquid flow in the respective flow circuit.
Figure 7:
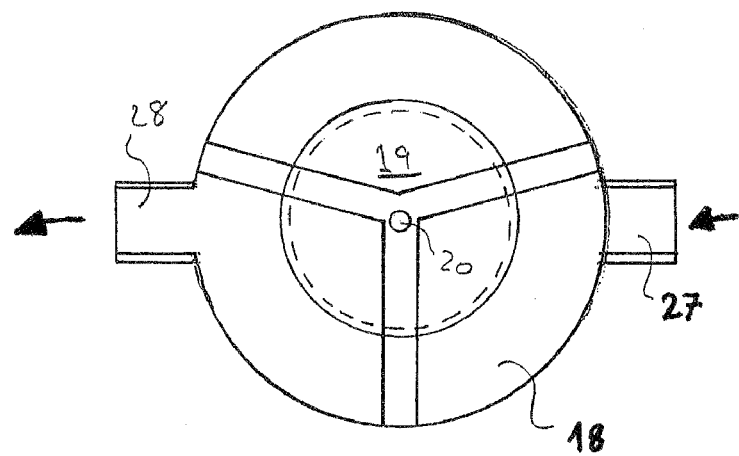
FIG. 7 is a schematic upper end view of the non-return valve shown in FIG. 6.

As shown in FIGS. 6 and 7, one embodiment of the non-return valve 17 comprises in addition to the parts already mentioned above, a valve seat 18 having a central fluid opening, a movable float body 19 for opening and closing the fluid opening and a spindle 20 for controlling the movement of the float body. As shown in FIG. 7, the spindle 20 is fastened to the valve housing by, for example, three bars. The float body 19 has an inverted conical shape with a virtually flat underside. The valve body may hollow and filled with a material that results in a valve body being slightly heavier than the water in the system.

This means that the non-return valve 17 is prevented from opening when the heated liquid comes from the "wrong" direction. To effect opening and closing of the non-return valve 17, the float body 19 is designed to respond to a predetermined pressure difference in the circuit. To be more precise, the float body must be balanced in such manner that it is lifted up from and lowered down towards the valve seat 18 in response to the pressure difference that occurs when the temperature in the liquid is changed in relation to a given value. This means that the float body 19 must be dimensioned in relation to the change in the liquid's density during the actual temperature change either upwards or downwards. As shown schematically in FIG. 5, each individual circuit may also be equipped with a lower one-way valve of the same type as the upper one-way valve 17, with the exception of the expansion chambers and the air valve. This means that less stringent requirements can be made with respect to the precise dimensioning of the float body 19, as two different pressure zones are established in the system. Suitable materials for the valve housing are brass, steel, acrylic, composite material etc., for the float valve, brass, silicone, acrylic, nylon, composite material etc. and for the seat and the controlling spindle, brass, steel etc.

Figure 8:
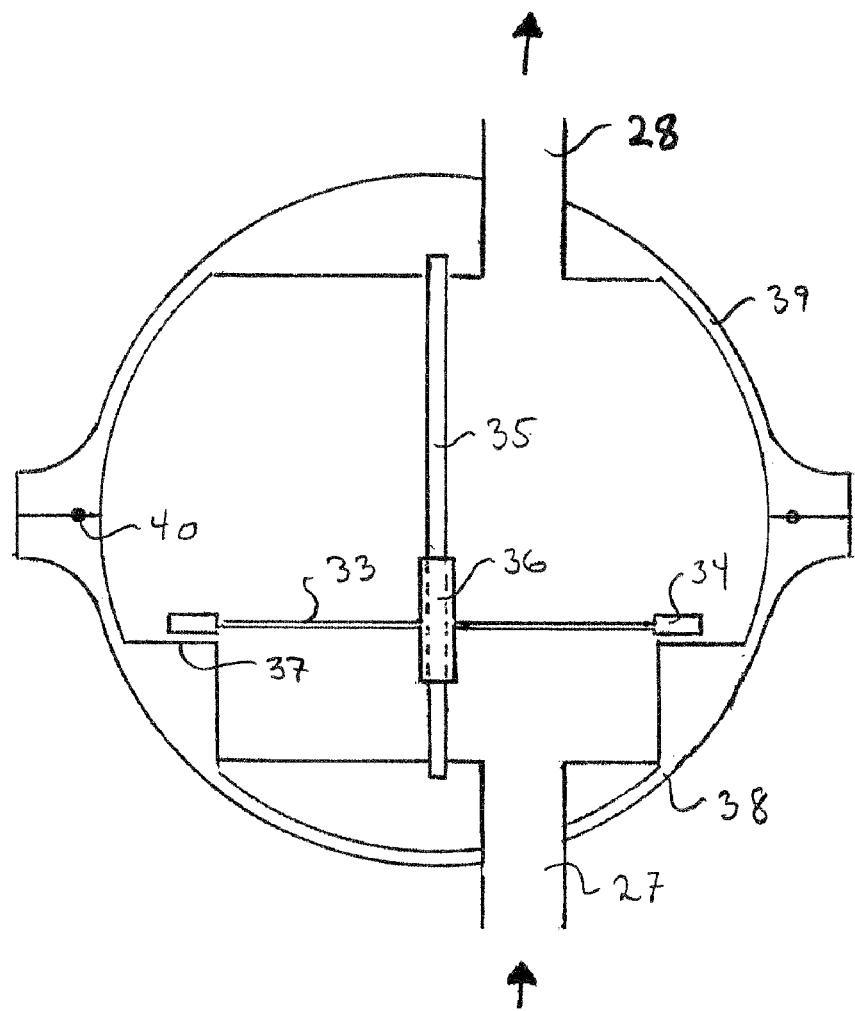
FIG. 8 shows a second embodiment of the non-return valve.

FIG. 8, shows a preferred embodiment of the non-return valve of the present invention. It comprises a two-part valve housing 38, 39 made preferably of a transparent material so that any bubbling and the functioning of the valve in general can be monitored visually. The housing parts 38, 39 are connected to each other in a suitable manner using a seal 40 in the form of, e.g., an O-ring. The valve seat 37 is formed in the upper housing part 39. The spindle 35 for the float body is made of steel, polished or coated, and can be inserted into bores in the housing parts when the valve is put together. Furthermore, the float body has a central, relatively thin portion 33 and an outer portion 34 of greater thickness, and a sleeve-shaped guide 36. The thickness of the outer portion 34 can be varied, so that the weight of the float body can be balanced in relation to the liquid, e.g., water, glycol solution, alcohol and oil, which is used in the system. The underside of the float body can be equipped with a pattern (not shown). Thus, the float body rotates during its movement up and down along the spindle in order to keep this clean. Unlike the valve mentioned above, the inlet and outlet 27, 28 are oriented in a vertical direction. Nor is there an expansion chamber in the valve itself, which means that such a chamber must be mounted separately, e.g., in connection to the outlet.

The valve body has a virtually flat underside. The flat underside allows for air bubbles in the water to collect and to create an additional lifting force to the valve body. This ensures that the valve will open even though the pressure difference over the valve is fairly low.

It has been found that if the valve body of the present invention has an area of 25 cm$^2$ and a weight of 20 grams, the pressure difference required to open the valve will be reached somewhat before the water starts to boil. This means that the valve should weight about 0.9 gram/cm$^2$ at maximum. A somewhat higher weight can work if the lifting force of the bubbles is taken into account, or alternatively, a lower opening temperature may be achieved if the lifting force of the bubbles is taken into account.

It is also possible to make the valve body even lighter by using a light weight material such as plastic or a combination of plastic and metal, e.g. brass.

To increase the lifting effect of the bubbles, the valve body may be equipped with a thicker peripheral edge portion, which results in a small downwardly facing chamber. The chamber may collect a larger amount of air than a fully flat underside. Hence, a greater lifting force will be contributed by the bubbles.

The water will contain air dissolved in the water. This air will gradually escape and over time collect in the highest portion of the system. This air will be removed by the bubble trap described above. However, it is virtually impossible to remove all the air from the water. Moreover, the water itself will have a tendency to create small steam bubbles when heated, even when heated to a temperature less than the boiling temperature. These steam bubbles will also add to the lifting of the valve body in the same way as the air bubbles.

Figure 9:
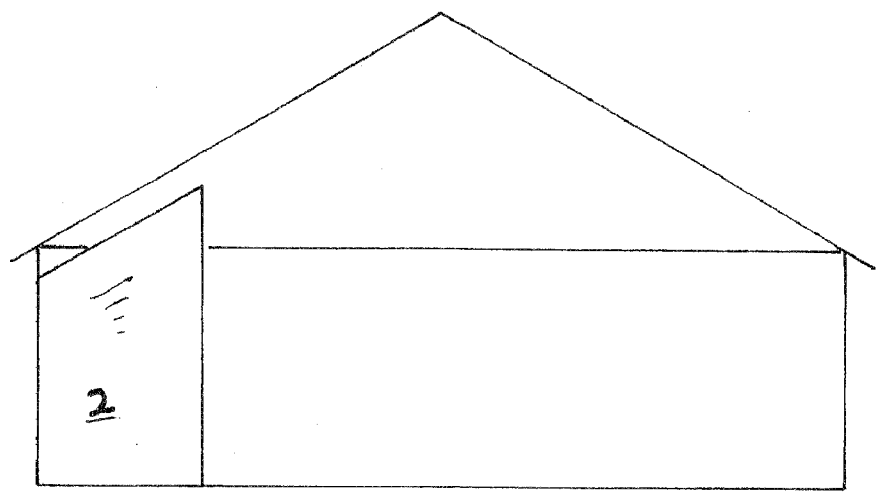
FIG. 9 is a schematic elevational view of an embodiment where the system according to the invention is integrated into the facade of a house.
Figure 10:
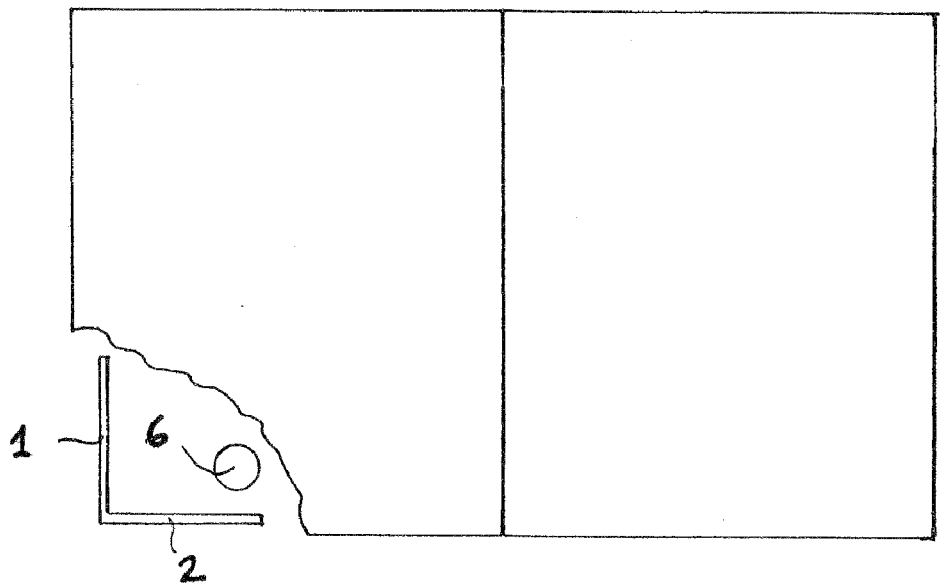
FIG. 10 is a schematic upper end view of the system shown in FIG. 9.

As shown schematically in FIGS. 9 and 10, the present solar collection system can preferably be integrated into the facade of a house or other building such as a holiday home etc. In the illustrated embodiment, the system consists of just the two main solar panels 1, 2 that are arranged in a house corner, and which are flush with the outside of the house facade. However, it will be appreciated that, for example, the solar collection system shown in FIG. 1 could just as easily be used, with the two additional upright solar panels 4, 5 positioned at a suitable point on one of the facades of the house and flush with its outer side. In that case, the two upright main solar panels 1, 2 and the horizontal additional solar panel 3 will extend outwards in relation to the house facade.

The invention claimed is:

1. A system for heating liquid by solar radiation, comprising:
    a plurality of solar panels, at least one liquid reservoir for heated liquid and circulation pipes for circulating liquid between a solar panel of the plurality of solar panels and the at least one liquid reservoir, the liquid circulating by thermosiphonic circulation;
    wherein the circulation pipes form part of an open flow circuit to the liquid reservoir, the open flow circuit connected to flow channels in each of the plurality of solar panels and the circulation pipes convey liquid from an upper end of the solar panel to the upper end of the liquid reservoir and back from a lower end of the liquid reservoir to a lower end of the solar panel;
    a non-return valve for controlling a flow of the heated liquid from each one of the plurality of solar panels located in a portion of the circulation pipe between the upper end of the solar panel and the at least one liquid reservoir, said non-return valve being adapted to open and close at a predetermined pressure in the liquid flow from the solar panel, said valve comprising a valve seat with a fluid opening, a float body being oriented substantially horizontal and having a fully flat underside at a central portion thereof and an element of greater thickness at a periphery of the central portion of the float body, for opening and closing the fluid opening, and being adapted to collects bubbles under the fully flat underside of the float body lifting the float body, and a spindle for controlling movement of the float body.

2. The system according to claim 1, wherein an area of the fully flat underside is substantially greater than a cross section of the circulation pipes.

3. The system according to claim 1, wherein the float body having a greater density than the heated liquid.

4. The system according to claim 1, wherein the at least one liquid reservoir has a large height relative to the at least one liquid reservoir's dimensions in cross-section.

5. The system according to claim 1, wherein at least two solar panels are joined together along adjacent lateral edges and outer, free lateral edges are positioned in such relationship to each other that a space can be formed between the solar panels for accommodating the at least one liquid reservoir and the circulation pipes.

6. The system according to claim 5, wherein the upper end of the solar panels that form side walls of a formed space slant downwards in a direction of the joined adjacent lateral edges and are covered by a solar panel placed on top of joined solar panels.

7. The system according to claim 5, wherein a solar panel extends out from and is joined to the free lateral edge of the respective joined solar panels.

8. The system according to claim 1, wherein at least one sunlight reflector is placed directly on the solar panel or panels in question.

9. The system according to claim 1, wherein at least one sunlight reflector is placed at a distance from the solar panel or panels in question.

10. A system for heating liquid by solar radiation, comprising:
a plurality of solar panels, at least one liquid reservoir for heated liquid and circulation pipes for circulating liquid between a solar panel of the plurality of solar panels and the at least one liquid reservoir, the liquid circulating by thermosiphonic circulation;
wherein the circulation pipes form part of a closed flow circuit in relation to a liquid in the liquid reservoir, and the circulation pipes connected to flow channels in each of the plurality of solar panels and circulation pipe sections which convey liquid from an upper end of the solar panel, through the liquid reservoir and back to a lower end of the solar panel;
a non-return valve for controlling a flow of heated liquid from a respective one of the plurality of solar panels located in a portion of one of the circulation pipes between the upper end of the one solar panel and the at least one liquid reservoir, said non-return valve being adapted to open and close at a predetermined pressure in the liquid flow from the solar panel, said valve comprising a valve seat with a fluid opening, a float body being oriented substantially horizontal and having a fully flat underside at a central portion thereof and an element of greater thickness at a periphery of the central portion of the float body, for opening and closing the fluid opening, and being adapted to collect bubbles on the fully flat underside to lift the float body, and a spindle for controlling movement of the float body.

11. The system according to claim 10, wherein the at least one liquid reservoir has a large height relative to the at least one liquid reservoir's dimensions in cross-section.

12. The system according to claim 10, wherein at least two solar panels are joined together along adjacent lateral edges and outer, free lateral edges are positioned in such relationship to each other that a space can be formed between the solar panels for accommodating the at least one liquid reservoir and the circulation pipes.

13. The system according to claim 12, wherein the upper end of the solar panels that form side walls of a formed space slant downwards in a direction of the joined adjacent lateral edges and are covered by a solar panel placed on top of joined solar panels.

14. The system according to claim 12, wherein a solar panel extends out from and is joined to the free lateral edge of the respective joined solar panels.

15. The system according to claim 10, wherein at least one sunlight reflector is placed directly on the solar panel or panels in question.

16. The system according to claim 10, wherein at least one sunlight reflector is placed at a distance from the solar panel or panels in question.

17. A system for controlling circulation of a liquid between a plurality of solar panels and at least one liquid reservoir, the system comprising:
a plurality of circulation pipes that receive a heated liquid from a top of flow channels of each of the plurality of solar panels and circulates the liquid to a top of the at least one liquid reservoir and returns the heated liquid from the a bottom portion of the at least one liquid reservoir to a bottom of each of the plurality of solar panels; and
at least one non-return valve controlling the circulation of the heated liquid in the circulation pipes between the at least one liquid reservoir and each of the plurality of solar panels, the at least one non-return valve comprising:
a valve seat with a fluid opening;
a float body oriented horizontally having a fully flat underside at a central portion thereof and an element of greater thickness at a periphery of the central portion of the float body, the float body being in contact with the valve seat in a closed position and free of contact with the valve seat in an open position; and
a spindle oriented vertically through a center of the center of the float body controlling the movement of the float body along a vertical axis,
wherein the at least one non-return valve being in the closed position, bubbles of the heated liquid collect on the underside of float body and upon the collected bubbles reaching a predetermined pressure, the float body rises opening the at least one non-return valve, the heated liquid flowing through the fluid opening and upon the collected bubbles falling below the predetermined pressure the float body returns the at least one non-return valve to the closed position.

* * * * *